United States Patent
Fischer

(10) Patent No.: US 8,770,488 B2
(45) Date of Patent: Jul. 8, 2014

(54) METHOD FOR THE PRODUCTION OF PUNCHED PARTS IN WEB- OR SHEET-LIKE PRINT SUBSTRATES AND THEIR FURTHER PROCESSING

(75) Inventor: Jules Fischer, Oberwil-Lieli (CH)

(73) Assignee: Fofitec AG, Dottikon (CH)

(*) Notice: Subject to any disclaimer, the term of this patent is extended or adjusted under 35 U.S.C. 154(b) by 126 days.

(21) Appl. No.: 12/806,479

(22) Filed: Aug. 12, 2010

(65) Prior Publication Data

US 2012/0037712 A1    Feb. 16, 2012

(51) Int. Cl.
*G06K 19/06* (2006.01)

(52) U.S. Cl.
USPC ............................ 235/494; 235/492; 235/493

(58) Field of Classification Search
CPC .............. G06K 19/06037; G06K 7/14; G06K 19/06187; G06K 19/12
USPC .......................................... 235/492, 493, 494
See application file for complete search history.

(56) References Cited

U.S. PATENT DOCUMENTS

| | | | |
|---|---|---|---|
| 6,248,199 B1* | 6/2001 | Smulson | 156/244.12 |
| 2007/0289460 A1* | 12/2007 | Tang | 101/181 |

FOREIGN PATENT DOCUMENTS

| | | |
|---|---|---|
| FR | 2809986 | 12/2001 |
| GB | 2272667 | 5/1994 |
| WO | WO 03/000505 | 1/2003 |
| WO | WO 2006/069404 | 6/2006 |
| WO | WO 2008/128362 | 10/2008 |
| WO | WO 2009/135332 | 11/2009 |

* cited by examiner

*Primary Examiner* — Sonji Johnson
(74) *Attorney, Agent, or Firm* — D. Peter Hochberg; Sean F. Mellino; Richard A. Wolf

(57) ABSTRACT

In the case of a method for the production of punched parts in web- or sheet-like print substrates, wherein the punched parts are punched in the pass of the print substrates through a punching tool and thereafter provided in the pass through a further tool with a feature which requires a positioning within predetermined limits on them, it is suggested according to the invention that markings are punched out with the punching tool in the print substrates in each case arranged in a tolerance-free manner in terms of their position relatively to the punched parts and that these markings are used in the subsequent processing of the punched parts for guiding the feature mentioned.

29 Claims, 3 Drawing Sheets

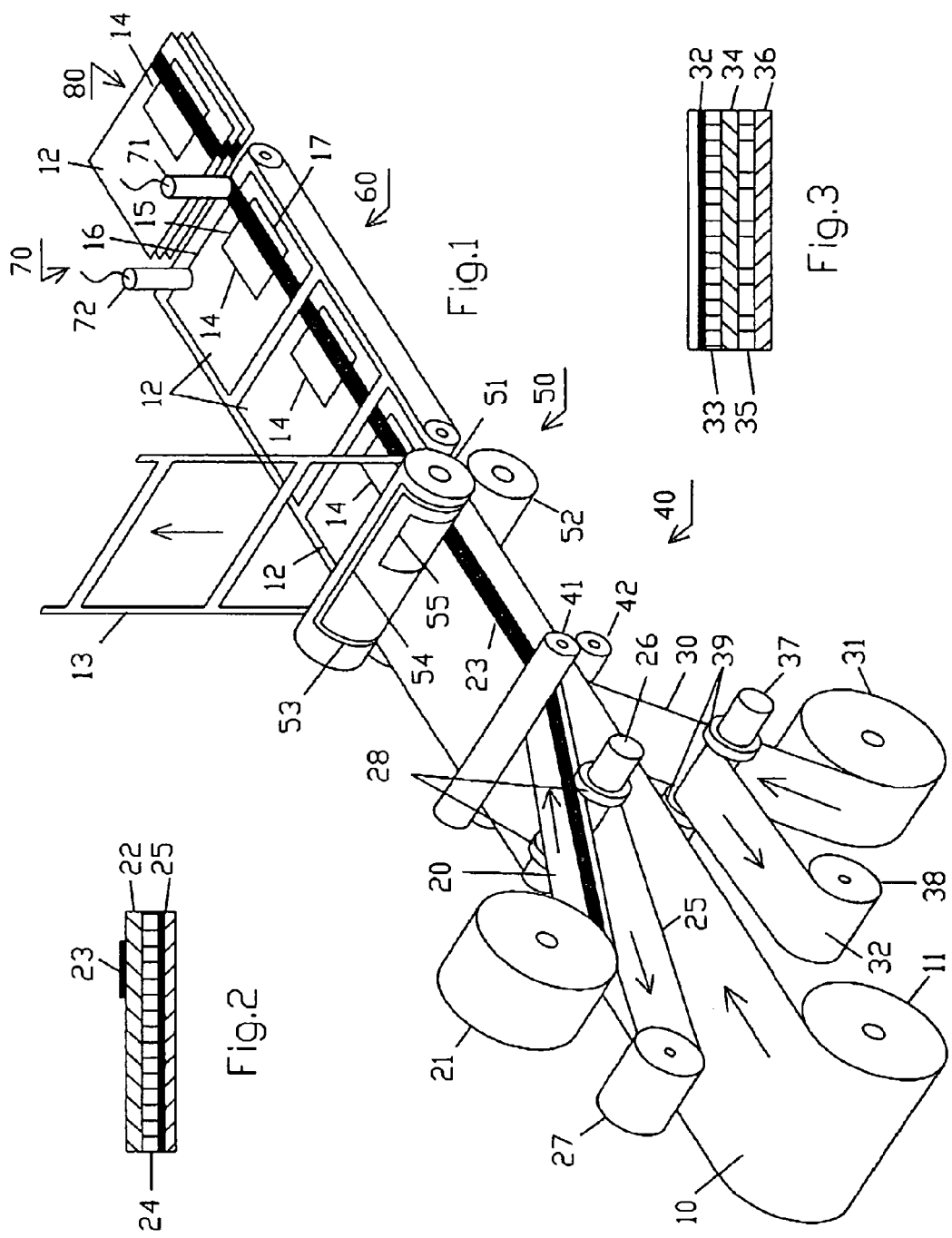

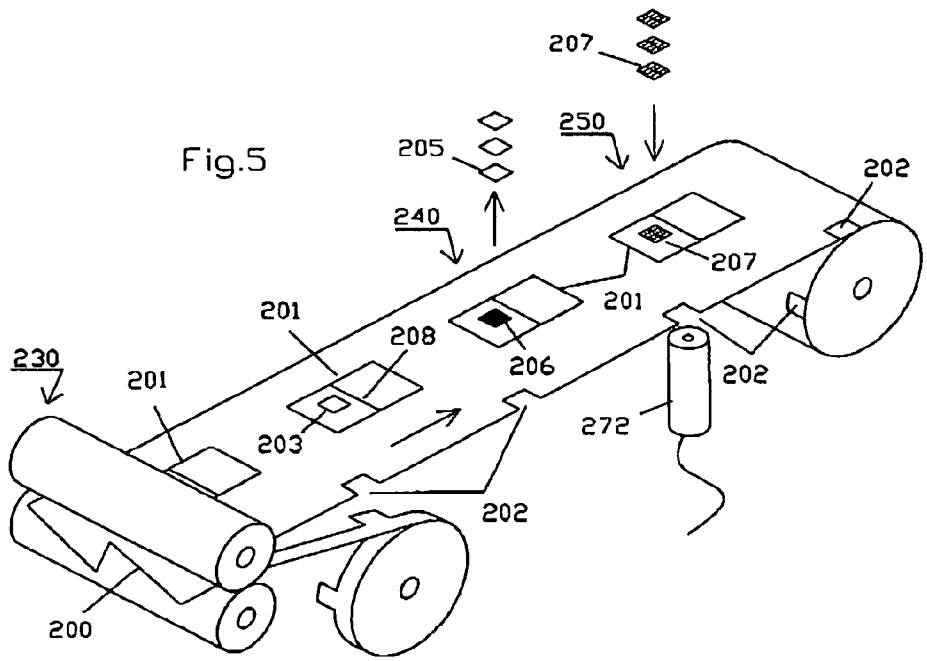
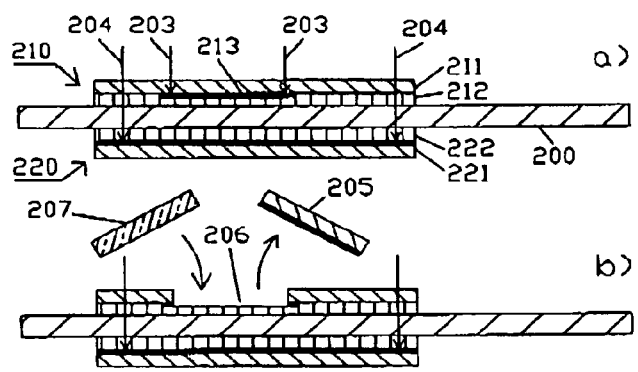
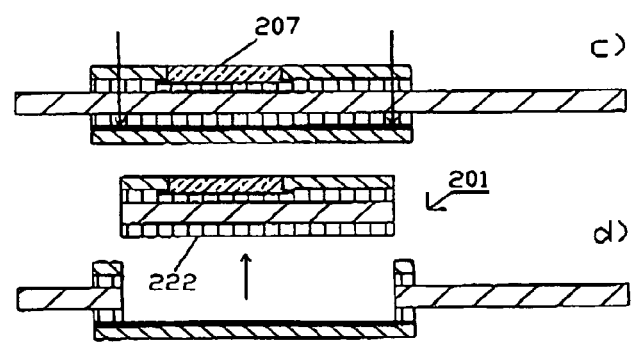
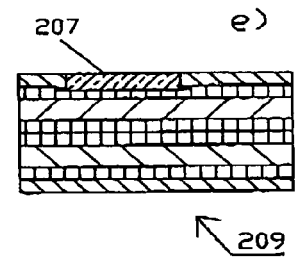

METHOD FOR THE PRODUCTION OF PUNCHED PARTS IN WEB- OR SHEET-LIKE PRINT SUBSTRATES AND THEIR FURTHER PROCESSING

BACKGROUND OF THE INVENTION

1. Field of the Invention

The present invention relates to a method for the production of punched parts in web- or sheet-like print substrates, wherein the punched parts are punched in the pass of the print substrates through a punching tool and thereafter provided in the pass through a further tool with a feature which requires a positioning within predetermined limits on them.

The invention also relates to web-like print substrates or stacks of sheet-like print substrates as products of this method.

The invention also relates to web-like print substrates or stacks of sheet-like print substrates as products of this method.

2. Description of the Prior Art

Methods of the previously mentioned type are known in various configurations, among which the so-called web finishing methods are also to be counted.

In web finishing, self-adhesive pieces of material (patches) made from paper and/or film are affixed in a pass to a, for the most part pre-printed, continuous web, likewise made from paper and/or film, wherein the punchings for producing cards for example are undertaken following that in the region of the affixations. The punchings are in this case carried out in such a manner that the punched parts remain connected, via scrap bridges or via at least one layer of the affixed pieces of material, to the continuous web and as a result remain integrated in the same. In the context of their further processing, the integrated punched parts are for example printed on for their so-called personalisation, wherein this can be carried out still on the continuous web or only after this has been divided into individual sheets (forms).

Recently, machines have also been available, with which the affixations and punchings mentioned can be carried out on sheets which are passing through.

Positioning tolerances result during the entire processing in the case of these known methods, specifically both in terms of the individual processing steps and with respect to the processing steps in relation to one another. These tolerances are typically approximately +/−1 mm. During affixation, a skew of the affixed pieces of material with respect to the pass direction of the web- or sheet-like print substrate can occur, wherein the angular tolerance is approximately +/−2°.

On account of these tolerances, affixation is often carried out first and then punching, wherein the punched parts are punched somewhat inside the affixed pieces of material. That leaves behind unattractive punching rings. In the case of a printing post-processing of the punched parts, the printing is conversely for the most part carried out in an oversized manner to the card edge, although a sharp-edged or bled-off printing of the punched parts would if appropriate be more optically appealing. Critical patterns such as labelling are avoided in the region of the card edge.

Forms with integrated cards as punched parts are known from WO2008/128362 A1, which are provided with a magnetic strip. In those forms which are produced with a web finishing method, on account of the positioning tolerances which arise in this case, it has not proven possible to write to the magnetic strip with an encoding in the continuous web or the forms produced therefrom and read this encoding off again at the individual cards with a satisfactory success rate after separating the cards from the continuous web or the forms. The success rate was less than 50%. In order that the encoding can subsequently be read again by means of a standard reading device for magnetic strip cards, it must, as prescribed by the standard ISO 7811-2, be positioned with low tolerances at certain distances from the card edges. The beginning of the encoded information on the magnetic strip is determined relatively to the adjacent card edge with the lowest tolerance of only +/−0.5 mm.

SUMMARY OF THE PRESENT INVENTION

The invention is based on the object, in the case of a method of the type mentioned at the beginning, of specifying how the punched parts, as long as they are still connected to the web- or sheet-like print substrates, can be provided with a feature to be guided in the pass through a further tool with substantially lower position tolerances than hitherto possible.

According to the invention, this object is achieved by means of a method with the features of Claim 1. This is accordingly characterised in that markings are punched out with the punching tool in the print substrates in each case arranged in a tolerance-free manner in terms of their position relatively to the punched parts and in that these markings are used in the subsequent processing of the punched parts for guiding the feature mentioned.

In terms of machine technology, this method can be implemented particularly simply in that a common punching plate, for example fixed on a magnetic cylinder, is used for the punching of the punched parts and the markings. Punching plates suitable to this end are available with tolerances with respect to the mutual distances of the punched parts and the markings of at most +/−0.05 mm. In comparison with the tolerances of +/−1 mm mentioned at the beginning, this should be understood in the context of the present invention as sufficiently "tolerance-free".

The features, which can be guided sufficiently precisely in the context of the subsequent processing of the punched parts using the markings punched out in a tolerance-free manner relatively to the punched parts, can in particular be an encoding on a magnetic strip, wherein the punched parts are cards or folded cards in the so-called credit card format.

By means of the accuracy which can be achieved with the invention, it can be ensured that in any case not more than 5% of the encodings applied in the web or the sheets on the detached card punched parts cannot be read on account of positioning tolerances with standard reading devices for magnetic strip cards. In fact, the reject rate can be brought clearly below 1% and that is in the case of web-like print substrates with several thousand punched parts and stacks of sheet-like print substrates with a few hundred sheets nonetheless.

The features, which can be guided precisely in the context of the subsequent processing of the punched parts using the markings punched out in a tolerance-free manner relatively to the punched parts, could also be chip card modules with a semiconductor chip and contacts, wherein the punched parts are again cards or folded cards in the so-called credit card format. Here, the standard ISO 7816-2 determines the position of the contacts of the chip card modules on the cards relatively to their edges. Using the markings according to the invention, the chip card modules can be placed sufficiently accurately on the cards in accordance with this standard. The chip card modules can, as a result and with reuse of the markings according to the invention, even also be written to with information if the cards are still connected to the print substrates. And, due to the exact placing of the chip card modules relatively to the card edges, this information can ultimately also be read again on the detached cards with a standard reading device for chip cards.

Preferably, the chip card modules are applied as a replacement for a piece of a part layer of the punched parts which is the same shape, wherein the pieces in the punched parts which are the same shape are punched out together with the punching of the punched parts with the punching tool. Using the markings punched out according to the invention at the same time as and in a tolerance-free manner with the pieces which are the same shape, the chip card modules can be placed accurately in the depressions in the punched parts which arise after the removal of the pieces which are the same shape.

Another feature which, if necessary, requires precise guiding could be an affixation in particular of a transparent film layer as cover layer on and flush with the edges of the punched parts.

A further feature which, if necessary, requires precise guiding could be printing on and flush with the edges of the punched parts.

Edges are preferably punched in the print substrates as markings, as edges can be detected easily with optical sensors. The edges are particularly orientated transversely and/or longitudinally to the pass direction in the further tool. In the case of edges orientated transversely to the pass direction, the interruption and/or the finishing of an interruption of a light beam directed perpendicularly onto the print substrates can for example be detected when the edges pass the light beam in the pass. In the case of edges orientated longitudinally to the pass direction, a light beam could be orientated onto these in such a manner that a part of the light beam falls on the printed substrates whilst the remaining part of the light beam reaches a sensor beyond the edges. The orientation of the edges transversely to the pass direction can then be determined from the intensity of the light received by the sensor and this orientation can be corrected dynamically if necessary. The edges orientated in the longitudinal direction do not have to be constructed to be particularly long to this end and particularly do not have to extend uninterruptedly along the entire printed substrate. In the case of web-like print substrates, the markings can as a result be produced by separation from notched edge strips with the punching tool.

In the case of web-like print substrates, the print substrate webs can also be separated into sheets directly together with the punching of the punched parts with the punching tool. The outer edges of the sheets can in this case be used as marking for guiding the changeable feature in the subsequent processing of the punched parts.

As soon as the method according to the invention, as mentioned previously, for producing print substrates with encoded magnetic strips on the punched parts is used, in the case of web-like print substrates the magnetic strips required to this end can be applied in the same pass with the punching before the punching onto the web-like print substrate in that a material strip provided with a magnetic strip is laminated onto it in a continuous manner. Positioning tolerances of the magnetic strip on the subsequently punched parts in the direction of travel of the print substrate web are dispensed with as a result, in that the magnetic strip extends in any case completely beyond the punched parts in the direction of travel of the print substrate web. Due to the endless process, the magnetic strip is also orientated always exactly parallel to the print substrate web. Positioning tolerances of the magnetic strip transversely to the direction of travel of the print substrate web can be overcome most simply by means of a certain excess width of the magnetic strip. There is no rule which limits the maximum width of the magnetic strip. On the other hand, due to lateral forced guiding means of the material strip carrying the magnetic web, which are mounted fixedly relatively to the punching tool and upstream of the same with only a small spacing, the magnetic strip can likewise be applied very accurately relatively to the punched parts during lamination transversely to the direction of travel of the print substrate web.

BRIEF DESCRIPTION OF THE FIGURES

The invention should now be explained in more detail on the basis of exemplary embodiments in connection with the drawing. In the figures:

FIG. 1 shows a device for producing print substrates with encoded magnetic strips on integrated cards;

FIG. 2 shows the layer structure of the magnetic strip web used in FIG. 1;

FIG. 3 shows the layer structure of the carrier material web used in FIG. 1;

FIG. 5 shows a device for producing print substrates with chip card modules on integrated folded cards;

FIG. 6 shows various sectional diagrams under a)-c) of the printed substrate web of FIG. 5, under d) of a sheet produced therefrom with folded card removed and under e) the folded card folded together to give a finished chip card.

DETAILED DESCRIPTION OF THE PRESENT INVENTION

Figure 4:
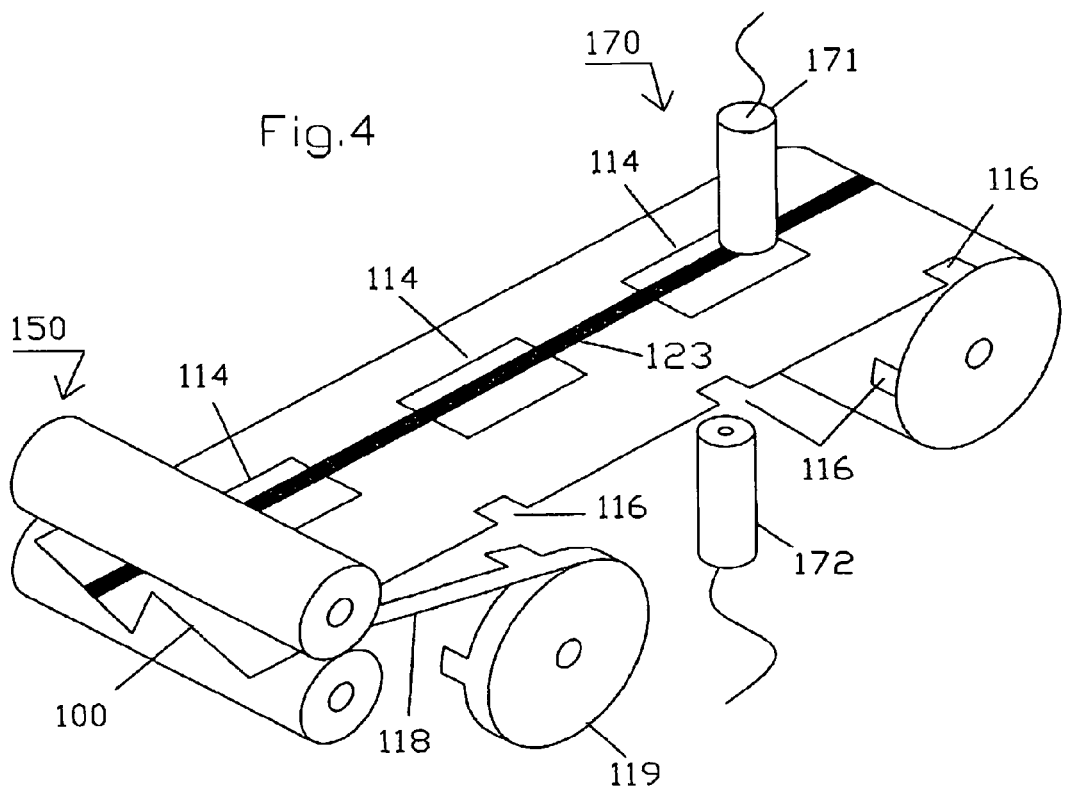
FIG. 4 shows a device for register mark punching on continuous webs.

In the case of the device of FIG. 1, in a laminating station 40, a magnetic strip web 20 is laminated onto the front side and, overlapped with that, a carrier material web 30 is laminated onto the rear side of a printed substrate web 10. The three webs are in each case unwound from rolls 11, 21 and 31 and run through the laminating station 40 between two pressure rolls 41 and 42.

The magnetic strip web 20 is a multi-layer laminate with a film layer 22 on which a magnetic strip 23 is continuously applied on the front side. On the rear side, the film layer is provided with an adhesive layer 24, by means of which it is adhesively bonded to the print substrate web 10. In order that it can be wound up onto itself, the magnetic strip web 20 on the roll 21 is still covered with a separating paper layer 25, which is pulled off from the adhesive layer 24 upstream of the laminating station 40 by means of a roll 26 and is thereafter wound onto a roll 27. The roll 26 is provided with a pair of lateral guides 28. The layer structure of the magnetic strip web 20 is shown schematically in FIG. 2.

The carrier material web 30 is likewise a multi-layer laminate with an adhesive layer 33, a transparent film layer 34, a peeling adhesive layer 35 and a carrier layer 36 made from thin paper or film. The carrier material web 30 is adhesively bonded to the print substrate web 10 by means of the adhesive layer 33. A separating paper layer 32 again ensures that the carrier material web 30 on the roll 31 can be wound up onto itself. Upstream of the laminating station 40, it is pulled off by means of a roll 37 from the adhesive layer 33 and wound up on a roll 38. The roll 37 is, like the roll 26, provided with a pair of lateral guides 39. The layer structure of the carrier material web 30 is shown schematically in FIG. 3.

With only little spacing in the pass direction behind the laminating station 40, a punching station 50 is arranged with an upper magnetic cylinder 51 and a lower counter cylinder

52. A punching plate 53 provided with fine burrs 54 and 55 is arranged on the magnetic cylinder 51 and fixed by means of the magnetic attraction of the magnetic cylinder 51. The burr 54 forms an outer rectangle e.g. in a conventional letter format and the burr 55 forms a smaller rectangle in a typical card format located therein.

With the punching plate 53 constructed in this manner, individual sheets 12 are punched out of the print substrate web 10, which is somewhat larger in terms of area, in the punching station 50. A punched grid 13, which is continuous and can correspondingly be conveyed away as a whole, is produced as waste here. One card 14 is punched out in each case in the sheets 12 with the burr 55. The punching depth is chosen here in such a manner that the lowest carrier layer 36 is not also punched through and remains intact. The cards 14 thereby remain integrated in the individual sheets 12 and are held on the carrier layer 36 by means of the peeling adhesive layer 35. With respect to the remaining layers, the cards 14 no longer have any connection to the material surrounding them. The peeling adhesive layer 35 has the property that the cards 14 can be detached from it and as a result can be removed from the sheets. Sheets and cards therefore have a structure as is known from WO 95/20493 A1. A magnetic strip in each case extends beyond the individual sheets 12 and beyond the cards 14 created in them, in that the magnetic strip 23 is applied continuously in the laminating station 40.

The separated sheets 12 are taken over by a conveyor belt 60 downstream of the punching device 50, transported further in the same direction with unchanged speed through below a writing device 70 and finally laid on a stack 80. Preferably, means (not shown) are still present on the conveyor belt 60 in order to hold the sheets in a straight and also laterally constant orientation, wherein these means can for example have a lateral guiding means along which longitudinal edges of the sheets 12 glide whilst resting against it.

The writing device 70 has a writing head 71 above the conveyor belt 60, with which the sections of the magnetic strips 23 extending beyond the cards 14 can in each case be written to with information, whilst the sheets 12 pass beneath it on the conveyor belt 60. So that this information can be read again with a conventional reading device for magnetic strip cards after the detachment of the cards 14 from the sheets 12, the information written must begin in the narrow distance range prescribed by ISO 7811-2 from the front edge 15 of the cards 14 in the pass direction and be correspondingly guided. For the guiding, the point in time at which the front sheet edge 16 in the pass direction of the individual A4 sheets passes through below the sensor 72 is registered with an optical sensor 72 precisely in each case. The front sheet edges 16 are in this case used as markings arranged in a tolerance-free manner in each case with respect to the cards 14 and their edge 15. The writing of the information is in each case only begun a certain time after this point in time. This time depends on the one hand on the pass speed of the sheets 12 on the conveyor belt 60 and on the other hand on the distance of the front card edge 15 from the front sheet edge 16. This distance is the same for all sheets, however, as the cards 14 are punched out together with the sheets 12 with the punching plate 53. The pass speed of the sheets 12 on the conveyor belt 60 can be kept constant by means of conventional drive controls. The writing to the magnetic strips 23 on the cards 14 can as a result be carried out in the pass direction within the narrow permitted tolerances of the standard ISO 7811-2.

For the most part, the information on the magnetic strip 23 is written into three strips, which are located very closely to one another and parallel to one another, wherein the standard ISO 7811-2 in this regard also prescribes distance ranges from adjacent parallel card edge 17 in which these must be arranged. Accordingly, the magnetic strip 23 and the writing head 71 must be arranged in a certain distance range from this card edge 17.

With respect to the magnetic strip 23, this is ensured by means of the mentioned lateral guiding means 28 for the magnetic strip web 20 on the roll 26, wherein the roll 26 and with it the lateral guiding means 28 are fixedly mounted relatively to the punching unit 50 and therefore to the punching plate 53 e.g. in a stable machine frame (not shown). In addition, the distance between the lateral guiding means 28 and the laminating station 40 on the one hand and also between the laminating station and the punching station 50 is dimensioned so small that the magnetic strip web 20 practically cannot move laterally between the lateral guiding means 28 and the punching unit 50. Due to the lamination of the magnetic strip web 20 as a continuous strip, it is finally ensured that the magnetic strip 23 is always orientated exactly in the pass direction of the webs 10, 20 and 30 and therefore also of the sheets on the conveyor belt 60 and is not orientated at an oblique angle relative to this direction.

With respect to the writing head 71, this can likewise be secured by means of the fixed mounting of the writing head 71 in a stable machine frame (not shown) relatively to the punching unit 50 and therefore to the position of the cards 14 produced therein and also to the guiding means which may be present on the conveyor belt 60. It would also be possible, however, to detect the lateral position of the individual sheets 12 on the basis of their edges orientated in the direction of travel and thereafter to orientate the sheets 12 laterally relatively to the writing head 71 or to suitably orientate the writing head 71 relatively to the sheets by means of automatic adjustment means.

The lateral guiding means 39 on the roll 37 are used for the laterally precise orientation of the carrier material web 30.

Although the division of the continuous webs, as described previously, into individual sheets together with the punching of the punched parts is expedient, it is not absolutely necessary. Depending on the type of further processing desired, it could also make sense, after the punching of the punched parts, to move on continuously and to wind the webs laminated to one another up again for a later pass through another device, if appropriate. In this case, there are no front edges of sheets available for detection and guiding of the information to be written to the magnetic strip. As an alternative, other, likewise easily and precisely detectable markings can be punched out in this case at the same time as the punched parts, however.

FIG. 4 shows an example for this, wherein rectangular indentations 116 are punched out as markings with a punching tool 150 at the same time as the punching of card punched parts 114 in a side edge of a print substrate web 100 already provided with a magnetic strip 123 and also further layers if appropriate. The indentations 116, like the separated sheets 12 of FIG. 1, have optically detectable edges arranged longitudinally and transversely to the direction of travel of the print substrate web 100. A sensor 172 of a writing unit 170 is also again shown in FIG. 4. Likewise, a writing head 171 for writing information to the magnetic strips 123 in the region of the card punched parts 114 is shown.

The punching of the indentations 116 is carried out in FIG. 4 in such a manner that a notched continuous edge strip 118 is created, which, like the punched grid 13 from FIG. 1, can be conveyed away continuously as a whole and e.g. rolled up on a roll 119. In this manner, loose punching wastes, the residue-free removal of which would be substantially more complex and which, inasmuch as the residue-free removal is not completely successful, could lead to processing problems in subsequent processing stations.

FIG. 5 shows a further application of the method according to the invention for the production of print substrates with chip card modules on integrated folded cards. In FIG. 5, a print substrate web 200 provided with front- and rear-side affixations 210, 220 is supplied to a punching station 230, in which simultaneously card punched parts 201 are punched in the region of the affixations and rectangular indentations 202 are punched at the edges as in FIG. 4. Further, simultaneously with these punchings, the card punched parts 201 are additionally provided with a surrounding punching 203 in the punching station. The punching station 230 can, as described previously, be constructed with a magnetic cylinder and a punching plate arranged thereon and provided with burrs.

FIG. 6 shows a cross section through the print substrate web 200 of FIG. 5 with the affixations 210 and 220 under a). The print substrate web 200 can be a paper web. The front-side affixation 210 comprises a cover film 211 and an adhesive layer 212 with which the cover film 211 is adhesively bonded onto the front side of the print substrate web 200. The cover film 211 is provided on a part surface towards the adhesive layer 212 with a separating layer 213 in the form of a siliconisation. The rear-side affixation 220 comprises a carrier layer 221 with separating properties, for example in the form of a silicone paper which is adhesively bonded with an adhesive layer 222 onto the rear side of the print substrate web 200.

The surrounding punching for creating the card punched parts 201 is designated with 204. The punching depth is chosen in such a manner that the lowest carrier layer 221 is not also punched through and remains intact. The card punched parts 201 thereby remain integrated in the print substrate web 200 and are held on the carrier layer 221 by means of the adhesive layer 222. Due to their separating properties, the card punched parts 201 can be detached from the composite with the remaining layers however, as FIG. 6 shows under d).

The already mentioned punching 203 runs within the part surface of the cover film 210 provided with the separating layer 213 and only cuts through the same. Due to the separating layer 213, the film piece 205 cut free with respect to the remaining cover film 210 by means of the punching 203 can be removed with revealing of the adhesive layer 212 located below this, as FIG. 6 shows under b).

The removal of the film pieces 205 is shown schematically at 240 in FIG. 5, wherein the removal can be realised in terms of machine technology by means of suction or by means of peeling during sharp deflection. Due to the removal of the film pieces 205, depressions 206 arise in the card punched parts 201, into which chip card modules 207 are subsequently inserted in FIG. 5 at 250. The adhesive layer 212 revealed by means of the removal of the film pieces 205 is used in this case directly for fixing the chip card modules 207. In terms of machine technology, the insertion of the chip card modules 207 can take place from rolled material with web finishing technology, by means of label affixing technology or with handling robotics.

For guiding the chip card modules 207 into the depressions 206 in the direction of travel of the print substrate web 200 and for exact positioning to the front and rear edges of the card punched parts 201 in the direction of travel, the transverse edges of the indentations 202 are registered in FIG. 5 with an optical sensor 272 and used as markings arranged in a tolerance-free manner relatively to the depressions 206. A sufficiently exact positioning of the chip card modules 207 transversely to the direction of travel of the print substrate web can, as described previously, also be ensured in the transverse direction by means of fixed mounting of the individual stations in a stable machine frame, by means of a suitable lateral guiding of the print substrate web and/or by means of detection of the longitudinal edges of the indentations 202 connected with a dynamic guiding.

If the thickness of the top layer 210 is selected in accordance with the thickness of the chip card modules 207, this fits flush with the surface of the card punched parts 201. If appropriate, the depressions 206 can also be constructed more deeply with the inclusion of further layers such as for example of the paper layer of the print substrate web 200, in order to achieve this flushness.

In addition to the removal of a film piece 205, under b), FIG. 6 also shows the insertion of a chip card module 207 into a depression 206. Under c), FIG. 6 shows the print substrate web 200 provided with the chip card module 207 on the integrated card punched part 201. Here, this could also be a sheet which has already been separated from the print substrate web. In FIG. 6d), as already mentioned, the removal of the card punched part 201 in the form of a folded card with an adhesive layer 222 revealed on its underside is shown. Thereafter, this folded card is also folded together in itself centrally along the folding line designated with 208 in FIG. 5, as a result of which the non-adhesive and also doubly thick chip card 209 shown under e) in FIG. 6 is created.

The shapes and relative proportions of the webs, sheets and punched parts used in the figures and also the arrangement of the punched parts in the webs or sheets are only exemplary. Preferably, the sheets are of A4 or letter format and the punched parts are of the credit card format prescribed by ISO 7811-2. In this case, it would also be possible to provide two such card punched parts one behind the other on each sheet in the pass direction. Of course, the entire area of the print substrate web or the sheets separated therefrom could be used for the production of a multiplicity of card punched parts in a plurality of rows next to one another.

Figure 7:
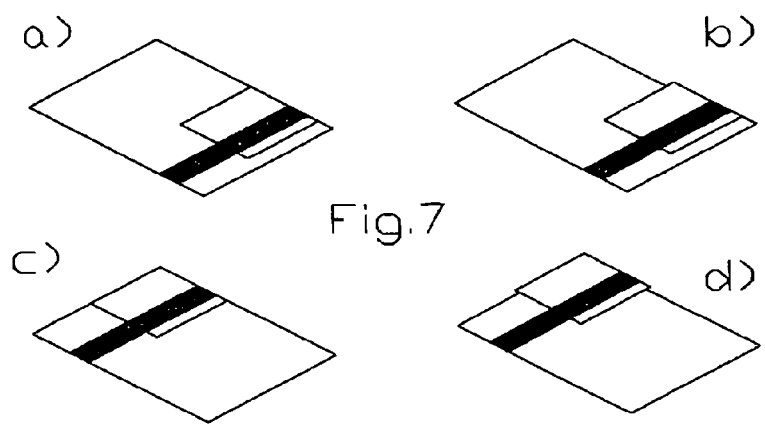
FIG. 7 shows various arrangements of magnetic strip cards in sheets under a)-d).

Insofar as the punched parts are punched together with the sheets, the punched parts also do not have to be arranged completely within the sheets, but rather can adjoin one or even two sides at their edge or furthermore even protrude beyond the sheets, which would facilitate their removal. FIG. 7 shows such arrangements of punched parts with magnetic strips under a)-d).

Likewise, the layer structure of the webs, sheets and/or punched parts described is only to be provided by way of example. Other or even additional layers could be provided, wherein the punched parts could particularly additionally be reinforced by means of additional layers. Examples for this are to be found in WO2008/128362 A1 cited at the beginning, wherein particularly thick, rigid and hard wearing cards made from otherwise relatively thin sheets can be obtained by means of the folded cards described there. Some of the layers described could also be omitted. If the carrier layer 36 and the peeling adhesive layer 35 were to be omitted for example, it would have to be ensured by means of other means, such as for example by means of the retention of scrap bridges, that the punched parts remain releasably connected to the material surrounding them. Instead of applying a film web precoated with a magnetic strip, such as the web 20, onto a print substrate web magnetic material could also be coated directly wetly onto a print substrate web.

The further processing of the punched parts also does not have to take place as described previously in the same pass with the punching of the punched parts and the markings. Due to the markings according to the invention, the punched parts can be provided with the feature to be guided in a later, separate pass by means of the further tool just as precisely. The punching tool and the further tool can as a result be positioned and operated independently of one another.

What is not shown in the figures, but would likewise be possible is a printing on the web 10 upstream or downstream of the laminating station 10 or even only on the already separated sheets downstream of the punching unit 50 in the same pass. Information which fits in terms of content with the information written with the writing head 71 onto the magnetic strip 23 could in this case in particular be printed. As a result, the sheets could e.g. be personalised individually.

It would also be possible to affix individual adhesive film pieced (patches), provided with a magnetic strip in each case, onto a print substrate web, insofar as a sufficient parallelism of the magnetic strip with the pass direction of the web can be achieved.

As mentioned at the start, machines have recently become available, with which affixations and punchings on continuous sheets can be implemented with very good precision. The use of such machines in the context of the method according to the invention would likewise be possible.

What has been described above are preferred aspects of the present invention. It is of course not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, combinations, modifications, and variations that fall within the spirit and scope of the appended claims.

I claim:

1. A method for producing punched cards in print substrates being in the form of a web or in the form of a sheet, comprising the steps of:
    in a pass of the print substrates through a punching tool, punching punched cards with the punching tool in the print substrates to obtain punched cards wherein said punched cards remain detachably connected to the print substrates; and
    punching out markings with the punching tool in the print substrates in each case arranged with tolerances of at most +/−0.05 mm in terms of their position relative to the punched cards, and thereafter
    in a subsequent pass of the print substrates through a further tool comprising the step of:
    providing said punched cards with a feature which requires a positioning within predetermined limits on them, wherein said markings are used for guiding the feature.

2. The method according to claim 1, comprising the step of using at least one material selected from the group consisting of paper and film as material for the print substrate.

3. The method according to claim 1, wherein the punching is carried out in such a manner that the punched cards remain connected at least to a part of the material of the print substrate adjacent to them, if necessary by additional layers, for further processing.

4. The method according to claim 1, wherein edges are punched out in the print substrates as markings.

5. The method according to claim 1, further comprising the step of producing the markings, in the case of print substrates being in the form of a web, by separating notched edge strips with the punching tool.

6. The method according to claim 1, wherein in said subsequent pass of the print substrates through a further tool, said step of providing said punched cards with a feature which requires a positioning within predetermined limits on them comprises, wherein said feature is a guided feature, the step of applying as the guided feature one encoding in each case to a magnetic strip extending on the punched cards.

7. The method according to claim 1, wherein in said subsequent pass of the print substrates through a further tool, said step of providing said punched cards with a feature which requires a positioning within predetermined limits on them comprises the step of applying as guided feature one chip card module in each case on the punched cards.

8. The method according to claim 7, further comprising the step of applying the chip card modules in each case as a replacement for a piece of a part layer of the punched cards which is the same shape, wherein the pieces in the punched cards which are the same shape are punched out together with the punching of the punched cards with the punching tool.

9. The method according to claim 1, wherein in said subsequent pass of the print substrates through a further tool, said step of providing said punched cards with a feature which requires a positioning within predetermined limits on them comprises, wherein said feature is a guided feature, the step of applying as the guided feature a printing in each case on the punched cards flush with edges of the punched cards.

10. The method according to claim 1, wherein in said subsequent pass of the print substrates through a further tool, said step of providing said punched cards with a feature which requires a positioning within predetermined limits on them comprises, wherein the feature is a guided feature, the step of affixing as guided feature a material layer in each case on the punched cards flush with edges of the punched cards.

11. The method according to claim 10, wherein said material layer is a transparent film layer.

12. The method according to claim 1, wherein, in the case of print substrates being in the form of a web, further comprising the step of laminating material strips provided with a magnetic strip in a continuous manner in the same pass with the punching before the punching onto the print substrates being in the form of a web.

13. The method according to claim 1, further comprising the step of affixing a patch provided with a magnetic strip in each case onto the print substrates in the same pass with the punching of the punched cards before the punching.

14. The method according to claim 1, wherein, in the case of print substrates being in the form of a web, in said pass of the print substrates through a punching tool said steps of punching the punched cards comprise the step of separating the print substrate being in the form of a web into sheets with the punching tool, and wherein, in such case, in said subsequent pass of the print substrates through a further tool one of an outer edge of the sheets is used as a marking for guiding the feature during said step of providing said punched cards with a feature which requires a positioning within predetermined limits on them.

15. A method for producing a print substrate web having a feature respectively positioned within predetermined limits on punched cards detachably connected to the web, said method comprising the steps of:
    providing a print substrate web having a plurality of said punched cards detachably connected to the print substrate web and markings punched out respectively spaced with tolerances of at most +/−0.05 mm in terms of their position relative to the punched cards; and
    providing the punched cards in the pass of the print substrate being in the form of a web through a tool with said feature, thereby using said markings for guiding and positioning said feature within said predetermined limits.

16. The method according to claim 15, comprising the step of using at least one material selected from the group consisting of paper and film as material for the print substrate web.

17. The method according to claim 15, wherein said step of providing the punched cards in the pass of the print substrate being in the form of a web through a tool with said feature comprises the step of applying as said feature one encoding in each case to a magnetic strip extending on the punched cards.

18. The method according to claim 15, wherein said step of providing the punched cards in the pass of the print substrate being in the form of a web through a tool with said feature comprises the step of applying as said feature one chip card module in each case on the punched cards.

19. The method according to claim 15, wherein said step of providing the punched cards in the pass of the print substrate being in the form of a web through a tool with said feature comprises the step of applying as said feature applying a printing in each case on the punched cards flush with the edges of the punched cards.

20. The method according to claim 15, wherein said step of providing the punched cards in the pass of the print substrate being in the form of a web through a tool with said feature comprises the step of affixing as said feature a material layer in each case on the punched cards flush with edges of the punched cards.

21. The method according to claim 20, wherein said material layer is a transparent film layer.

22. A method for producing a stack of or a plurality of print substrates being in the form of a sheet, the print substrates being in the form of a sheet having a feature respectively positioned within predetermined limits on punched cards detachably connected to them, said method comprising the steps of:
providing said stack of or said plurality of print substrates being in the form of a sheet, each print substrate being in the form of a sheet having at least one of said punched cards detachably connected thereto and at least one outer edge wherein the relative position between the punched cards and the at least one outer edge in the stack is arranged with tolerances of at most +/−0.05 mm; and
providing the punched cards in a pass of the print substrates being in the form of a sheet through a tool with said feature, thereby using said outer edge for guiding and positioning said feature within said predetermined limits.

23. The method according to claim 22, further comprising, the step of using at least one material selected from the group consisting of paper and film as material for the print substrate.

24. The method according to claim 22, wherein said step of providing the punched cards in the pass of the print substrate being in the form of a web through a tool with said feature comprises the step of applying as said feature one encoding in each case to a magnetic strip extending on the punched cards.

25. The method according to claim 22, wherein said step of providing the punched cards in the pass of the print substrate being in the form of a web through a tool with said feature comprises the step of applying as said feature one chip card module in each case on the punched cards.

26. The method according to claim 22, wherein said step of providing the punched cards in the pass of the print substrate being in the form of a web through a tool with said feature comprises the step of applying as said feature applying a printing in each case on the punched cards flush with the edges of the punched cards.

27. The method according to claim 22, wherein said step of providing the punched cards in the pass of the print substrate being in the form of a web through a tool with said feature comprises the step of affixing as said feature a material layer in each case on the punched cards flush with the edges of the punched cards.

28. The method according to claim 27, wherein said material layer is a transparent film layer.

29. A method for producing punched cards in print substrates being in the form of a web or in the form of a sheet, comprising the steps of:
in a pass of the print substrates through a punching tool:
punching punched cards with the punching tool in the print substrates to obtain punched cards wherein said punched cards remain detachably connected to the print substrates; and
punching out markings with the punching tool in the print substrates; and
in a subsequent pass of the print substrates through a further tool:
providing said punched cards with a feature which requires a positioning within predetermined limits on them, wherein said markings are used for guiding the feature.

* * * * *